United States Patent [19]

Miller

[11] 3,851,671
[45] Dec. 3, 1974

[54] SNAP-ON LEAK PROOF CLAMP
[76] Inventor: John H. Miller, Rt. 4, Box 300, Manitowoc, Wis. 54220
[22] Filed: Jan. 2, 1973
[21] Appl. No.: 320,158

[52] U.S. Cl................ 138/99, 48/190, 285/DIG. 22
[51] Int. Cl............................................... F16l 55/16
[58] Field of Search... 138/99, 98; 285/15, DIG. 20, 285/DIG. 22, 151, 375, 45, 419; 292/256; 48/190, 192, 193

[56] References Cited
UNITED STATES PATENTS

| 549,594 | 11/1895 | Cooper et al. | 285/273 X |
| 624,770 | 5/1899 | Eibee | 138/99 |
| 969,919 | 9/1910 | Stulp | 138/99 |
| 1,928,316 | 9/1933 | Muto | 285/373 |
| 1,928,570 | 9/1933 | Mustico | 285/373 X |
| 2,173,399 | 9/1939 | Mills | 138/99 |
| 2,785,911 | 3/1957 | Kaufman | 285/DIG. 20 |
| 3,310,322 | 3/1967 | Carroll | 285/45 X |
| 3,517,701 | 6/1970 | Smith | 285/15 X |
| 3,542,077 | 5/1968 | Muchmore | 138/99 |
| 3,689,110 | 9/1972 | Ferguson | 285/15 |

Primary Examiner—Richard C. Queisser
Assistant Examiner—Daniel M. Yasich
Attorney, Agent, or Firm—Alter Weiss Whitesel & Laff

[57] ABSTRACT

A snap-on clamp assembly useful for preventing leaks at the coupling of underground pipelines or for effectively repairing leaks at the couplings. The clamp comprises a spherical shell preferably fabricated of plastic or the like. The shell comprises first and second halves. Each half is flanged and may be hinged together. A slide on clamp arrangement closes the halves together and effectuates the sealing action therebetween.

3 Claims, 12 Drawing Figures

PATENTED DEC 3 1974
3,851,671
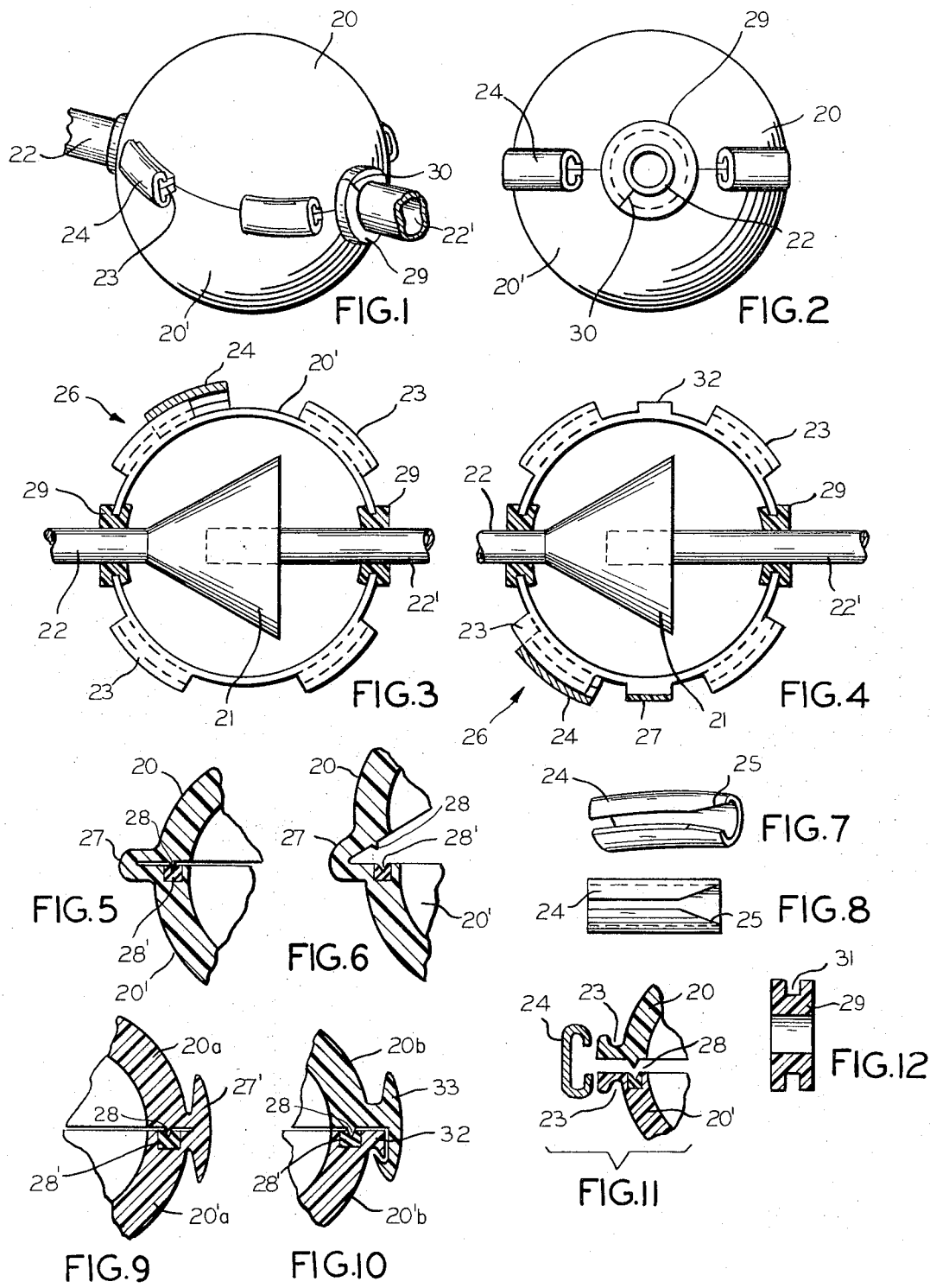

SNAP-ON LEAK PROOF CLAMP

This invention relates to clamps for preventing leaks at the fittings of pipelines, and more particularly to a spherical enclosures that may be applied and snapped over the joints, couplings, or the like, of underground pipelines including, but not limited to, gas pipelines and water pipelines.

The prime object of this invention is to provide devices that are designed to be constructed in two identical portions that may be snapped into position, or hingedly placed into position before being clamped and sealed.

Still another object of the invention is to provide devices that are simple in construction, and may be applied or removed without special mechanical skill or equipment.

A further object of the invention is to provide leak-proof enclosures that are sealed to the pipes to which they are applied.

It is manifest to anyone familiar with underground piping that pipe coupling such as bell-joints quite frequently develop a leak due to corrosion or the like. It is the purpose of this invention to provide an enclosure constructed of any corrosion resistant material that may be easily applied to the pipes to permit the fluid or gas to be conveyed without interruption or leakage.

Other and further objects of the invention will become more apparent as the description proceeds when taken in conjunction with the drawings, in which:

FIG. 1 is a perspective view of the assembled device applied to the pipes;

FIG. 2 is an end view of the assembled device constituting the invention, shown in FIG. 1;

FIG. 3 is a top view of the lower half of the device shown in FIG. 1, with portions shown in cross-section;

FIG. 4 is a similar view as shown in FIG. 3, but with the two halves hingedly supported and retained by a snap;

FIG. 5 is a fragmentary cross-sectional view of the hinge portion in a closed position;

FIG. 6 is a similar view as shown in FIG. 5 but in an open position;

FIG. 7 is a perspective view of the channel clamp;

FIG. 8 is a side view of the clamp shown in FIG. 7;

FIG. 9 is a fragmentary cross-section of a modified hinge arrangement;

FIG. 10 is a similar view as shown in FIG. 9 with a snap arrangement for retaining the upper and lower body portions in engagement with one another;

FIG. 11 is a schematic cross-sectional view of the parts and the clamp arrangement; and FIG. 12 is a cross-sectional view of the gasket for retaining the pipes in sealed relation with the spherical body.

Similar characters of reference indicate the corresponding parts and features throughout the several views, and referring now to the same, the body of the device which is shown spherical in contour, consisting of two halves 20 and 20' forming a housing and enclosing the bell joint 21, of the pipes 22 and 22'.

Each of the semi-spherical sections 20 and 20' are provided with outwardly projecting channeled members 23, on their radial edges. The channel members 23 are held in engagement with one another by channel clamp members 24. The clamp members 24 engage, slidably, the channel members 23 (see FIG. 11). Inasmuch as the channel clamp members 24 slide into the channelled members 23 (see FIGS. 3 and 4) at 26, the edges of the clamps 24 are shown tapered at 25, for easy engagement.

If desired the two semi-spherical body members 20 and 20' may be of one piece construction, joined by a hinge portion 27, as shown in FIGS. 5 and 6. The hinge of the embodiment portion 27 is an integral part of both members 20 and 20' (see FIGS. 5 and 6).

The flat contact surface of the body members 20 and 20' may be equipped with a tongue and groove arrangement 28, 28', respectively (see FIGS. 5, 6, 9, 10 and 11), which may be of any conventional design, and arranged to keep the semi-spherical units in air tight engagement when forming the enclosure body members 20a and 20'a may be joined with a fish tail like arrangement.

A channelled gasket 29 constructed of flexible material surrounds the pipes 22 and 22'. This gasket 29 is cut at 30, so it may be easily applied onto the radial surface of the pipes 22 and 22'. The groove and channel 31 engages the opening in the body sections 20 and 20' (see FIGS. 3 and 4). Obviously, the center opening in the gasket 29, may be of any diameter to fit the outer surfaces of the pipes 22 and 22'.

If desired the device when constructed in a manner in which the two semi-spherical portions 20 and 20' are hingedly supported may be equipped with a snap arrangement. As shown in FIG. 10, the lower portion 20'b is equipped with a projecting member 32, and the upper portion 20b is equipped with a hook member 33 (see FIG. 10), acting as a snap to hold the two semi-spherical portions 20 and 20' in engagement with one another while the channel clamp members 24 are applied to the members 23.

From the above description it will become apparent that the device is designed to perform the function, and purpose for which it is intended. It may be easily applied over the pipes, the bell-joint, or pipe couplings to provide a sealed enclosure.

Although I have specifically shown and described the parts and features constituting the invention, I am fully cognizant of the fact that many changes may be made without effecting the operativeness of the device, and I reserve the rights to make such changes, without departing from the spirit of the invention, or the scope of the appended claims.

Having thus described the invention, what I claim and desire to secure by Letters Patent in the United States, is:

1. A snap-on leak proof clamp assembly for preventing or repairing leakage at the coupling of underground pipelines, said clamping assembly comprising a plastic housing sufficiently large to non-contiguously enclose ball type couplings, said housing comprising first and second semi-spherical sections having flat contact surfaces on the ends thereof, said housing having spherical shape and including openings for the ingress and egress of said pipelines, said openings including gasket means for sealing the openings around the pipelines, the first of said sections including a circumferential groove on the flat contact surfaces end thereof, said second section flat contact end surface including circumferential tongue means for fitting into said groove to seal said spherical housing when said first and second sections are forced together, flange means integrally formed on each end of each of the sections at the junction point of each of said sections, and a plurality of resilient clamps slidable over said flange means for sealing said sections together to seal said spherical housing.

2. The snap-on leak proof clamp assembly of claim 1 wherein said resilient clamp means each comprise a longitudinal extending C clamp, and the edges of said clamp being tapered at one end to enable sliding said clamp over said flange.

3. The snap-on leak proof clamp assembly of claim 1 wherein said sections are integrally hinged together.

* * * * *